(12) United States Patent
Curtis et al.

(10) Patent No.: US 7,069,321 B1
(45) Date of Patent: Jun. 27, 2006

(54) MECHANISM FOR NESTED EXPANSION OF DATA COLLECTION FROM ONE COMPUTER TO MULTIPLE COMPUTERS

(75) Inventors: James R. Curtis, Placerville, CA (US); Eric M. Soderberg, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 822 days.

(21) Appl. No.: 09/942,909

(22) Filed: Aug. 31, 2001

(51) Int. Cl.
*G06F 15/173* (2006.01)

(52) U.S. Cl. ............... 709/225; 709/223; 719/313; 719/316

(58) Field of Classification Search ............. 709/200, 709/201–203, 217, 223–225, 280, 300, 226, 709/315, 316, 317; 714/4; 719/313–316, 719/317
See application file for complete search history.

(56) References Cited

U.S. PATENT DOCUMENTS

| | | | | |
|---|---|---|---|---|
| 5,353,412 | A * | 10/1994 | Douglas et al. | 709/243 |
| 6,427,168 | B1 * | 7/2002 | McCollum | 709/224 |
| 6,438,705 | B1 * | 8/2002 | Chao et al. | 714/4 |
| 6,755,700 | B1 * | 6/2004 | O'Rourke | 440/7 |
| 6,862,736 | B1 * | 3/2005 | Hudis et al. | 719/316 |
| 2002/0123966 | A1 * | 9/2002 | Chu et al. | 705/43 |

OTHER PUBLICATIONS

"CIM Network Model White Paper" CIM V2.7 Distributed Management Task Force, Inc. Dec. 2, 2003.*
"Unified Service Level Monitoring using CIM", Marcus Debusmann et al., University of Applied Sciences Department of Computer Science, Wiesbaden (IEEE International Enterprise Distributed Object Computing Conference (EDOC 2003).*

* cited by examiner

*Primary Examiner*—Jeffrey Pwu

(57) ABSTRACT

A system and a process is provided for requesting and obtaining information about Resources on a Cluster. The system utilizes a Multiplex Provider, that may be provided on every Node of the Cluster. The Multiplex Provider facilitates the communication of requests to various Nodes without requiring Providers, at such Nodes, to be Cluster-aware and without requiring a Client to directly communicate the request to every Node. The present invention also includes a scope, specifying a range for which any request may be applied. The scope may be determined utilizing a discovery process, wherein each Node on a Cluster identifies the Providers and Resources associated with the Node. The process also entails capturing the results of a request for information in a tabular format. The tabulation may be specified to include all results of the query, unique results of the query and/or based upon any other desired tabulation.

19 Claims, 5 Drawing Sheets

MECHANISM FOR NESTED EXPANSION OF DATA COLLECTION FROM ONE COMPUTER TO MULTIPLE COMPUTERS

TECHNICAL FIELD

The present invention relates to the field of determining information from multiple computers connected on a system. More specifically, the present invention relates to the gathering of information utilized on a system based on a Common Information Modeling (CIM) standard.

BACKGROUND

Commonly, pluralities of computers, databases, printers and other computing or computing related devices are often established in clusters, as members or elements of a network, or even as loosely defined connections (which may be permanent or temporary) of computers and/or computing devices. Such configurations shall hereafter collectively be identified as a Cluster. Similarly, those computing devices establishing the connections between and with other such devices shall be defined as Nodes. Further, it is commonly appreciated that various virtual and/or real devices and components are often utilized in and/or accessed by a computing device (for example, printers, hard drives, monitors, software applications and others). For purposes of the present discussion, such devices are herein identified as Resources. Such Resources are generally accessible and/or utilized via other systems and devices, and/or users of such systems and devices via Nodes on a Cluster. Such users (which may be human or automated) are herein collectively defined as Clients. As such, it is commonly appreciated that Clients, via Nodes on Clusters, often utilize and need information pertaining to all the Resources or specific types or instances of Resources accessible to the Client.

Since Clients often desire to know what type of Resources are accessible via a given Cluster, various software devices have been developed that enable Clients to obtain information pertaining to a Resource, a Node, a Cluster or a combination thereof. Such devices are often called Object Managers (OM). More specifically, standardized OMs have been developed, including for example, the Common Information Modeling standard (CIM). The CIM standard for OMs was created by a consortium of industry companies and can be found at http://www.dmtf.org. It is commonly appreciated that CIM and WBEM are extremely similar, as such CIM is herein defined to also include WBEM.

The CIM standard outlines the basic architecture for a CIM compliant OM (CIMOM) but does not enforce any implementation details. As is commonly appreciated, CIM enables application developers to code their Client's applications so that they may interact with the CIMOM using a predefined, platform independent, set of Application Program Interfaces (APIs). This basic CIM architecture enables a CIMOM to startup and load any CIM compliant Resource via a Provider, wherein a Provider is a piece of software code that will call whatever routines are needed to gather data in order to provide the necessary objects in a schema. Those skilled in the art appreciate that a schema is an abstraction of something that exists in the real world. As such, in CIM, a schema is a group of classes (collections or sets of objects) that have only one owner. For example, a collection of disc drives might have an owner identified as a specific database, i.e., a Resource, that is connected to the Cluster and is accessible via the associated Provider.

Each Provider is suitably configured to extract information from the various objects with which it may be associated. For example, in a multi-disc or tape database, a database Provider is configured to obtain necessary information from each object in the database. Such information might include available memory, file allocations, and other information. There are often hundreds if not thousands of Providers on a given Node and/or Cluster. Provider writers commonly come up with a schema of what they are going to provide, and then code their respective Providers to provide such objects upon request. The CIM standard defines those APIs utilized to interact and extract information from a Provider. These standards are utilized by Provider writers.

As such, it is to be appreciated that a pre-defined methodology exists for identifying information about a Resource, a group of Resources, or even a sub-set of a Resource to an OM under the CIM standard. Under these standards, each CIMOM is configured such that it can determine which Provider is providing the desired information (for example, the amount of available memory in a database). Further, the CIMOM is configured to "ask" for and receive such information from a Provider. However, the CIM standard does not specify how information from Providers is to be obtained. Since Cluster managers often desire Cluster-wide configuration and Resource information, an approach is needed to determine how Resources are configured on a Cluster using Providers and requests from CIMOMs.

One common methodology by which a Client CIM can obtain Cluster-wide information concerning Resources is shown in FIG. 1. As shown, this prior art process basically entails having the Client CIM contact every Node on the Cluster. As can be readily appreciated, this approach requires numerous connections between the requesting Client CIM 102 and a plurality of Node CIMOMs (110, 112, and 114) on Nodes A, B and C (104, 106 and 108, respectively). In turn, each of the Node CIMOMs, may have multiple Providers connected thereto (for example, Providers A and B, i.e., 116, 118, 120, 122, 124, and 126). For even a simple three Node example, where each Node possesses two Providers (as shown in FIG. 1), the request from the Client CIM 102 over the communications network 128 entails requests to three separate Node CIMOMs, which may end up requesting information from six Providers. In an extremely large system, wherein hundreds if not thousands of Nodes may exist, this approach can be extremely time and Resource consuming. This may be especially true when the Client CIM 102 can only contact one Node at a time and, thus, is forced to contact each Node on a Cluster in a serial manner. Further, since the network connection 128, in certain embodiments, may not be secure, this process may also entail numerous authorizations and authentication steps being performed with each request by the Client CIM 102 to a Node CIMOM (for example, one provided on Node A 104, Node B 106 or Node C 108). These authorizations may also create delays in the processing of the request and the operating efficiency of the Cluster as a whole. Therefore, the approach shown in FIG. 1 is often tedious and inefficient. This approach is often considered as operating at too high a level of abstraction and is therefore undesirable because of the burdens and inefficiencies it places upon the Client CIM 102 and the Cluster in general.

Another prior art approach often utilized to obtain information from Providers by a Client CIM 202 is shown in FIG. 2. This approach again begins with the Client CIM 202 establishing a connection via a communications network 228 with another Node (for example, Node B 206) on the Cluster. However, unlike the example shown in FIG. 1, for this embodiment only a single connection is established between the Client CIM 202 and a single Node (for example, Node B 206). In short, this approach does not require the Client CIM 202 to contact each and every Node on the Cluster. Instead, this approach utilizes Providers that are multi-node aware. One example of a multi-node aware Provider is provided in U.S. Patent Application Serial Number concurrently filed herewith, on Aug. 31, 2001, by Jim Curtis, et al. and entitled "An Application Container that Allows Concurrent Execution on Multiple Nodes in a Cluster", the contents of which are herein incorporated, in their entirety, by reference.

As shown in FIG. 2, this second prior art method requires each Provider to include a data daemon (for example, data daemons 230, 232, 234, 236, 238 and 240). Each data daemon contains the appropriate software codes such that when a request from a single Provider (for example, Provider A 220 of Node B 206) is communicated to the various other Nodes on the Cluster, each corresponding data daemon (for example, data daemon A 230 on Node A, or data daemon A 234 on Node B 206, or data daemon A 238 on Node C) provides the requested information, when available. In this prior art embodiment, every Provider, and thus every data daemon, must be Cluster-aware.

Noticeably, even the requesting Node (Node B 206) contains data daemons 234 and 236 from which configuration information may be needed. Further, this approach requires each Provider to be capable of contacting other Providers on the Cluster. Since certain applications may not provide Cluster-aware Providers, this approach may be of limited applicability. Further, instead of having the Client contact every Node on the Cluster, this approach merely reduces the decision/contacting processes to the Provider level. Further, this approach requires every Provider to be capable of multiplexing requests to every other Node on the Cluster. As such, this approach reduces the level of abstraction to too low a level and requires every Provider to possess capabilities previously provided by the requesting Client CIM, as shown in FIG. 1. Therefore, a new system and methodology for obtaining information from a Provider is needed which does not place the burden for determining information about Resources on a Cluster at either the Client CIM (i.e., too high of a level of abstraction) or at the Provider level (i.e., too low of a level of abstraction).

SUMMARY

The present invention provides a methodology for collecting information from a plurality of computers, on a Cluster, by utilizing a Multiplex Provider (MP). The MP enables single-system CIM compliant OM Providers to be used, without modification, to provide multi-node data from a Cluster(s). By utilizing the MP, a Client can connect to a single Node on the Cluster and obtain information on several different peer Nodes, via a Node CIMOM and an MP, without having to establish a direct connection to each Node on the Cluster and without requiring every Provider to be Cluster-aware.

Further, the MP avoids putting the burden of multiplexing on either the Client or the Provider writer. The Client requests multi-node data through a scoping hint that is passed along with the request to a Node CIMOM. This scoping hint identifies those Nodes from which the Client desires to receive the requested information. The Node CIMOM suitably inspects the request in order to determine which classes/schemas of objects are being requested and which Providers provide those classes/schemas. With the MP mechanism, the Node CIMOM can also determine which classes/schemas should be multiplexed, and utilizes the scoping hints to decide with which Nodes to open a connection. In this manner, the MP effectively acts as a proxy for the Node CIMOM. The MP takes on the role of a Client CIM (as discussed previously with reference to FIG. 1) by requesting information from other Nodes on the Cluster, while also removing such tasks to a lower level of abstraction such that the Client CIM is not directly contacting every Node on the Cluster with requests for information. Additionally, in its requests to the other Nodes, the MP does not specify a scoping hint so as to not trigger the MPs on the other Nodes to intercept the request. As such, by not providing the scoping hints, a single set of data for the Cluster, from the desired Nodes, may be provided to the Client by the MP.

In addition to streamlining the process for requesting data and alleviating the burden from the Client and the Providers, the MP also provides data filtering capabilities. Specifically, once the MP receives responses from the other Nodes, the MP gathers the data, eliminates any redundant data, and provides the information (preferably in a tabular form) back to the Client CIM which appropriately communicates the information back to the Client. Further, the MP may also be configured to manage other related processing steps, such as authorizations and authentications to remote Nodes.

As such, the present invention provides an improved methodology for obtaining information from Resources on a Cluster. The methodology is preferably configured to be implemented on a CIM environment, however, it may also be accomplished in other environments, including, but not limited to, WBEM. The features and functions of the present invention are further described in the drawing figures, the detailed description and the claims.

DETAILED DESCRIPTION

As mentioned previously, the present invention utilizes an MP to obtain information on Resources, from Nodes on a Cluster, upon a Client's request. Unlike the prior art methods, the present invention does not require the Client to contact every Node on the network in order to obtain information about Resources available via the Cluster. Thus, the present invention alleviates many of the data connectivity and data obtaining tasks from the Client and shifts such tasks down to the MP, where they can be more easily implemented and with less Client to multiple Node communications being needed. It is to be appreciated, that by utilizing this approach the data traffic on the network 328 (see FIG. 3) may be significantly reduced since every Client is not continually contacting every Node on the Cluster whenever Resource information is desired.

Figure 1:
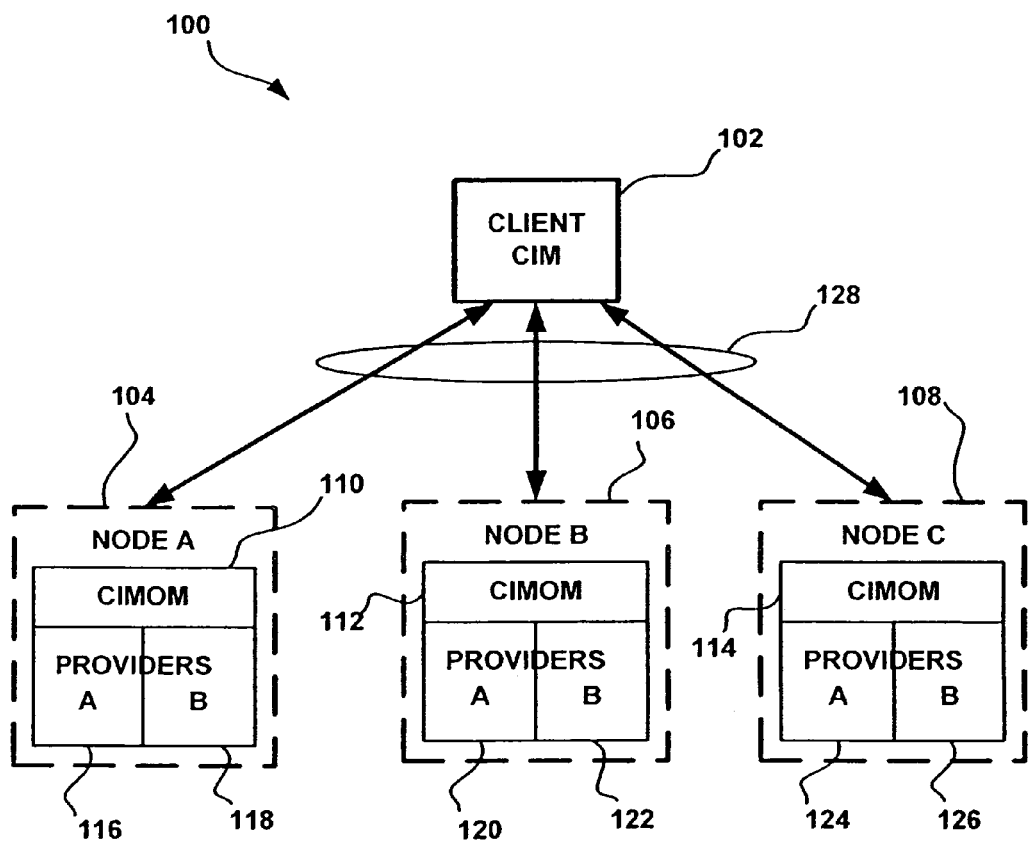
FIG. 1 provides an illustration of a prior art method commonly utilized to obtain information about Resources on a Cluster upon a Client's request.
Figure 2:
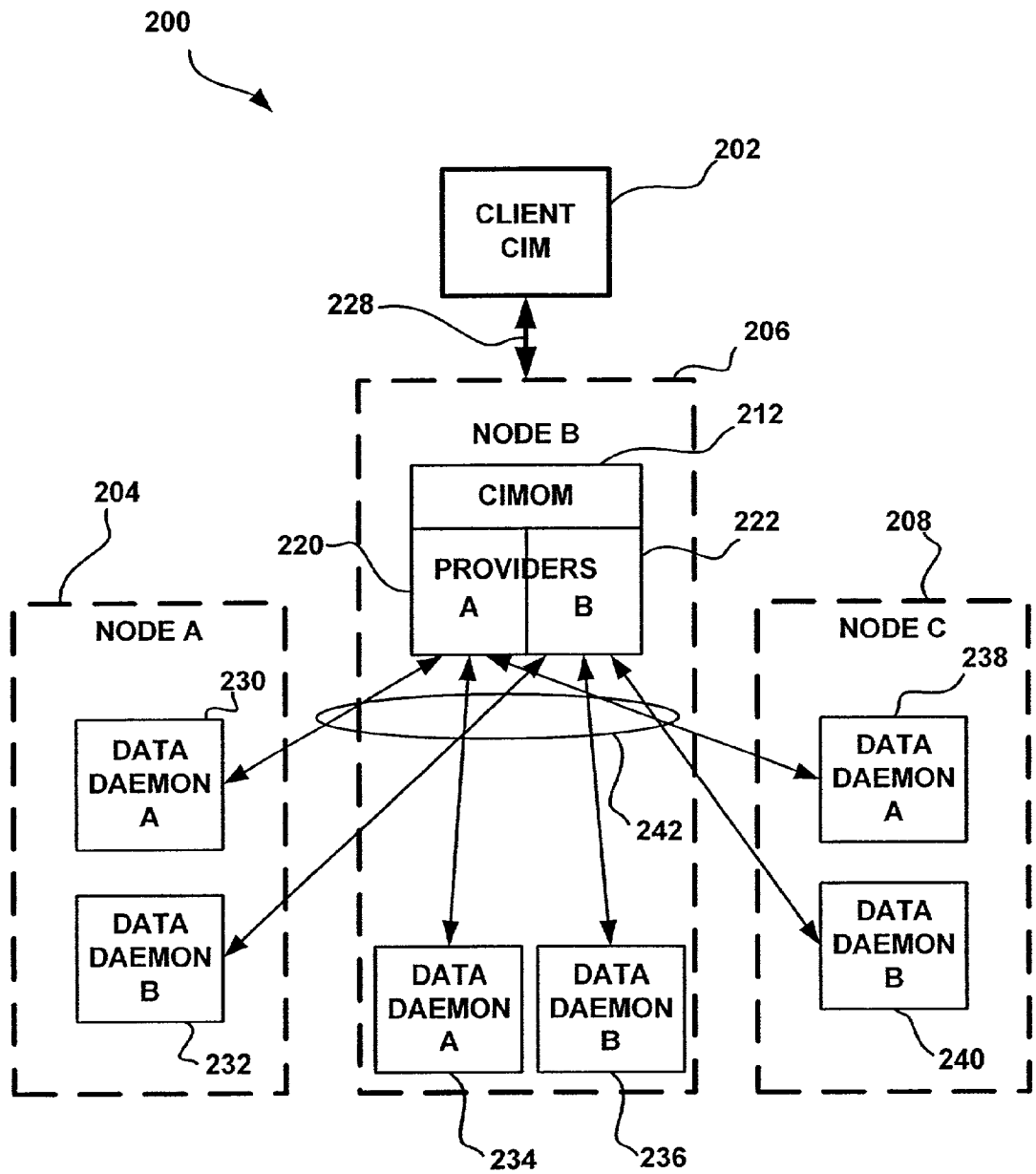
FIG. 2 provides an illustration of a second prior art method commonly utilized to obtain information about Resources on a Cluster upon a Client's request.

Additionally, unlike the prior art method shown in FIG. 2, the present invention does not require every Provider to be Cluster-aware. Instead, the MP provides the needed Cluster-awareness. Since an MP is preferably loaded onto each Node, Providers that are not Cluster-aware may be suitably added to a Node while information about such Provider may be obtained from other Providers or Clients by the MP. As such, the present invention greatly simplifies the adding of Providers to Nodes, in that such Providers do not need to be or become Cluster-aware. The Cluster-awareness is preferably provided by the MP associated with each Node on the Cluster. Further, the present invention expands the possible number of Providers that may be utilized on a Cluster, because all that is required, in order to be "known" on the Cluster, is the ability to interface with the MP without requiring any capabilities to "know" of other Providers on the same or other Nodes.

Further, the MP approach of the present invention also provides enhanced update capabilities. Instead of having to update every Provider with Cluster information, as provided for with the embodiments shown in FIG. 2, the present invention enables Cluster managers to only update the MP associated with a Node or multiple Nodes on the Cluster. It is readily appreciated that updating the MP on each Node is less extensive of an operation than having to update every Provider on a Cluster. Similarly, economies of scale realizations may also be experienced with regard to verifications, authentications, authorizations, and other processes which may need updating or augmenting. The present invention generally removes the target of such updates from the individual Providers and places it on the MP, thereby, further incurring savings in time and resources needed to maintain and/or operate a Cluster.

Figure 3:
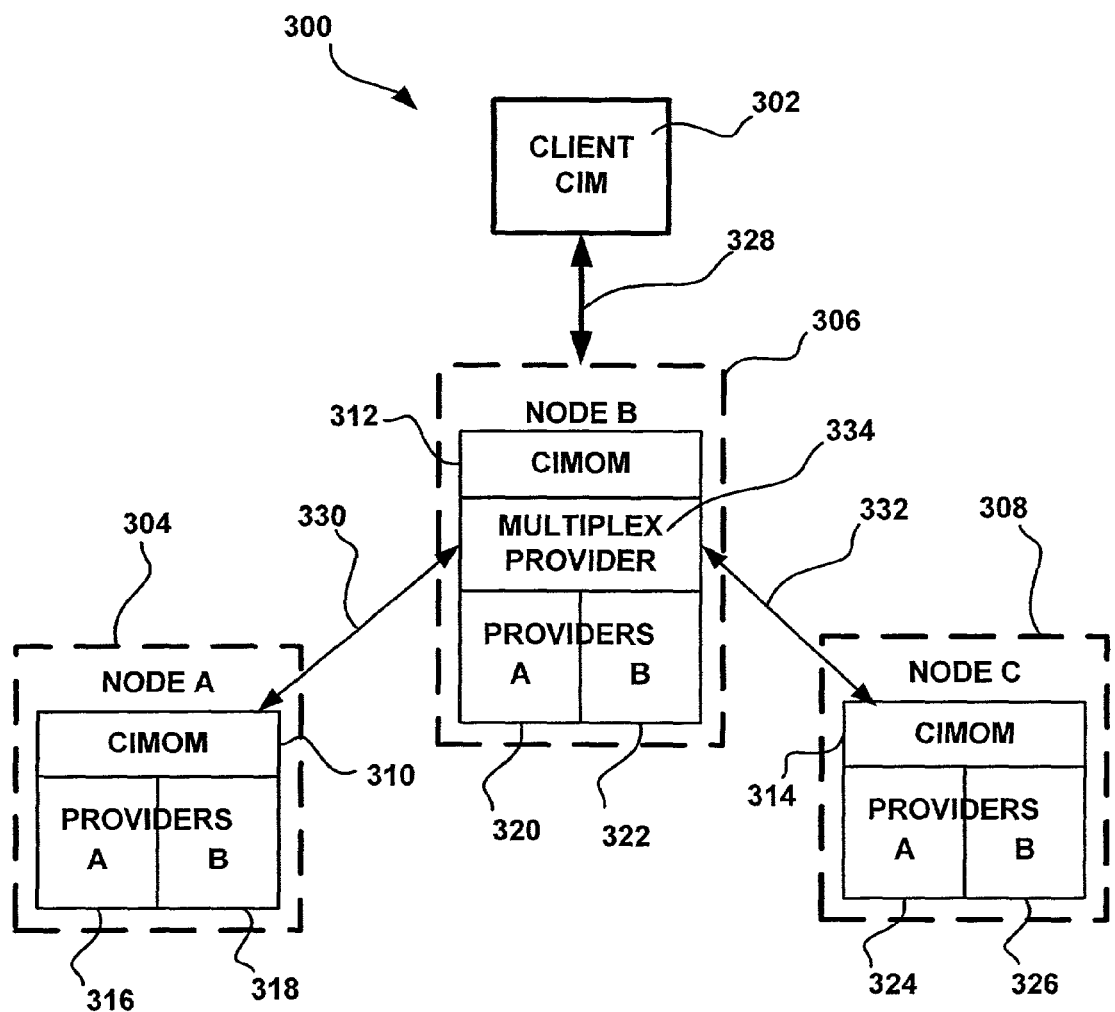
FIG. 3 provides an illustration of the process of the present invention wherein an MP is utilized to obtain information about Resources on a Cluster upon a Client's request.

Referring now to FIG. 3, one embodiment of an implementation of the process of the present invention is depicted. As shown, this embodiment utilizes a Client CIM 302 that has established a connection, via a network 328, with a Node (in this case Node B 306) on a Cluster 300. The Node 306 suitably includes a CIMOM 312 that includes an MP 334. The MP 334 is suitably connected via data links 330 and 332 to the various other Nodes (Node A 304 and Node B 308) on the Cluster 300. It is to be appreciated that such data links 330 and 332 may be same links utilized by the Node 306 to communicate with its peer Nodes or any other links. Further, the data links 330 and 332 may also be separate links, specifically configured for communications between MPs and the other Nodes on the Cluster and/or the CIMOMs associated with such other Nodes. Thus, any link between the MP and the additional CIMOM Nodes on the Cluster may be utilized by the present invention.

Further, the MP 334 communicates directly with the CIMOM on each Node (310 and 314, respectively), thereby alleviating the burden of such communications from the Client CIM 302 and/or the Providers (316, 318, 320, 322, 324, and 326). It is to be appreciated that each Node, in the preferred embodiment, includes an MP 334. As such, a Client does not need to connect to a specific Node in order to receive Resource related information that is obtained Cluster-wide, or for even a limited sub-set of a Cluster. However, the present invention may be configured in alternative embodiments, as desired, such that only specific Nodes contain the MP and provide the capabilities of requesting and obtaining information from the various Providers on the various Nodes, or specific Nodes, of a Cluster.

Figure 4A:
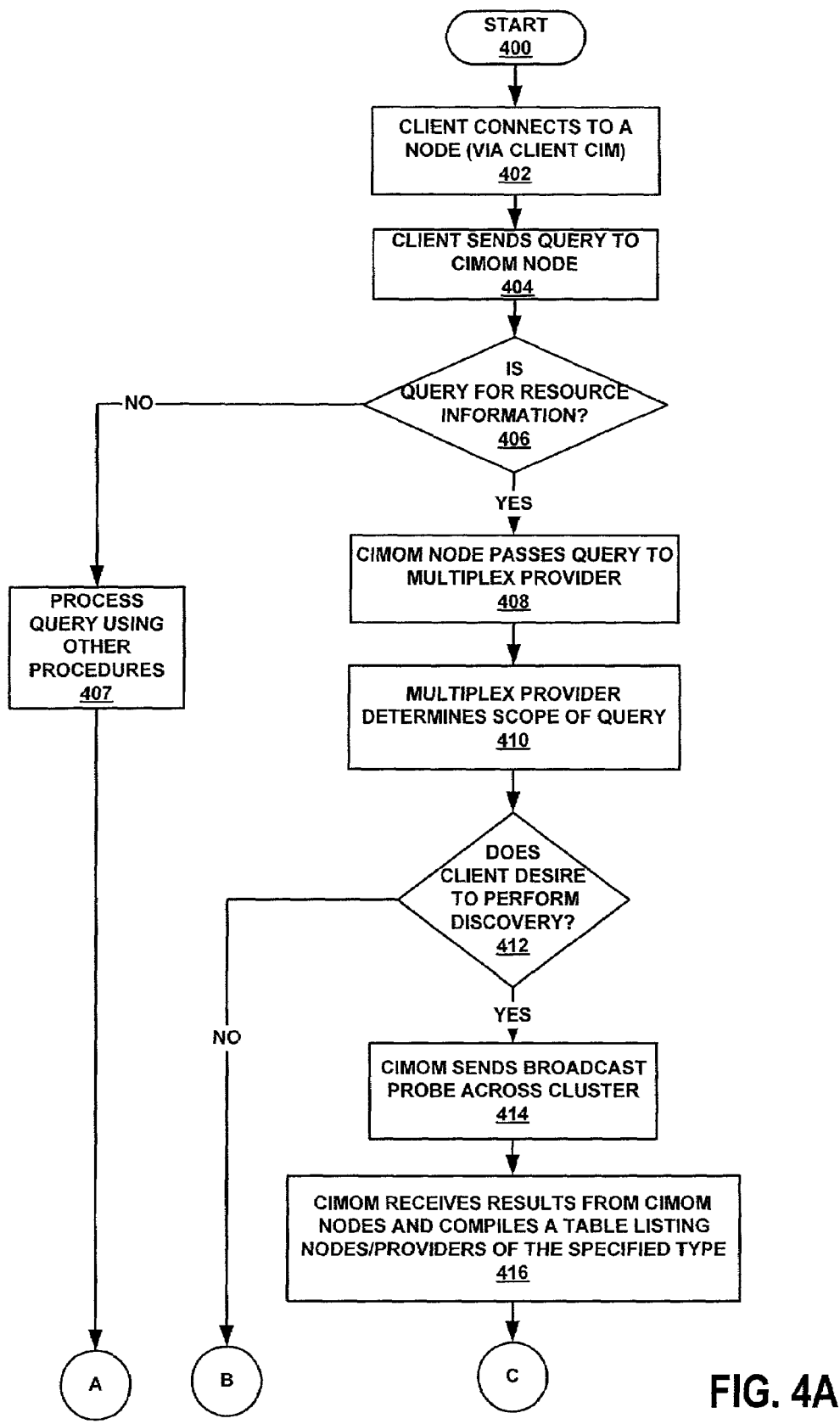
FIGS. 4A and 4B provide a flow diagram of the process by which the MP obtains information from the various Nodes on a Cluster.
Figure 4B:
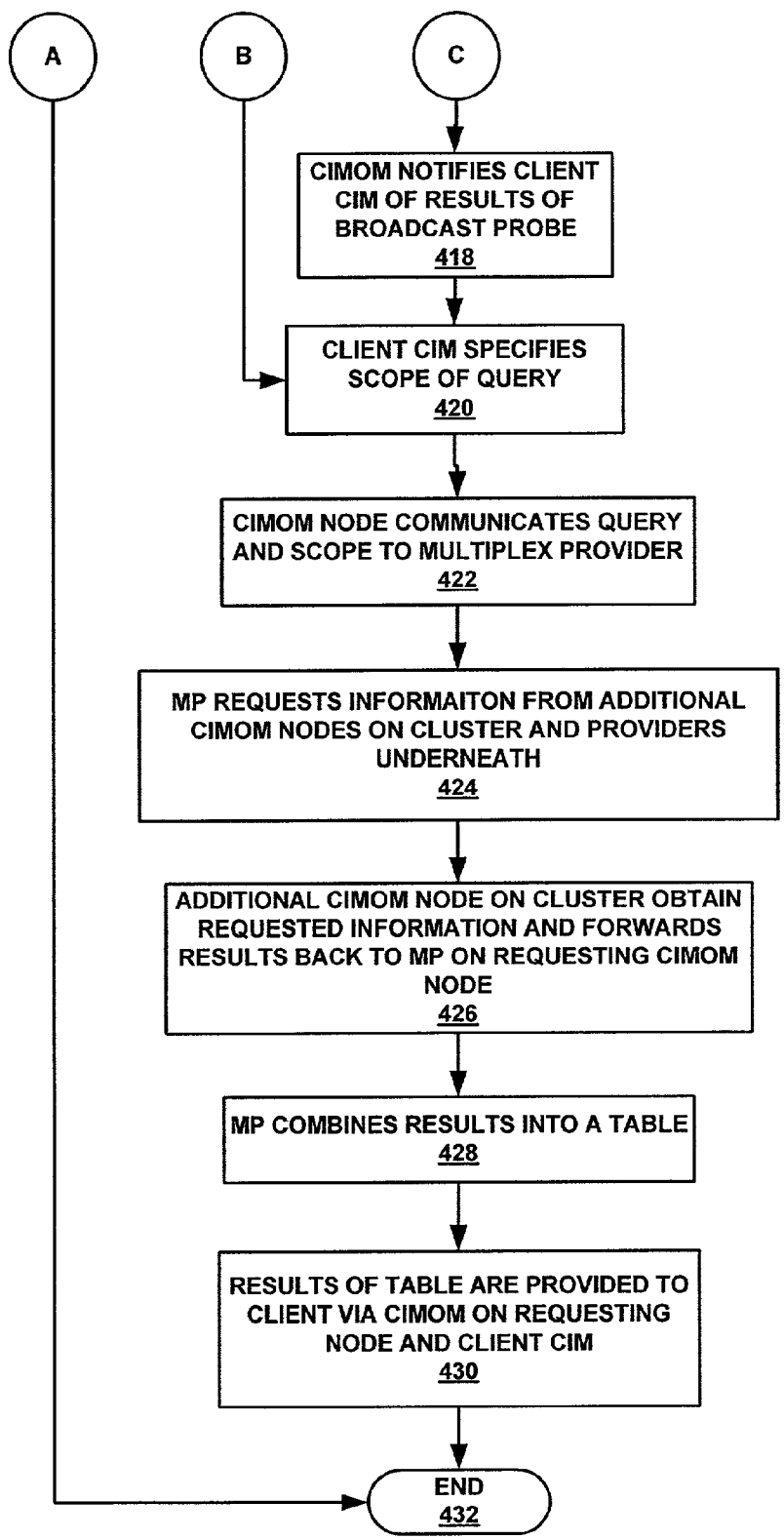

Referring now to FIGS. 4A and 4B (with reference to FIG. 3), one embodiment of a process, by which the present invention utilizes an MP to obtain information on Resources associated with a Cluster, is shown. The process begins with a Client connecting to a Node 306 via a Client CIM 302 (Block 402). It is to be appreciated, that each Client is suitably configured with a CIM compatible interface that allows the Client to establish communications with a particular Node on the Cluster (for example, Node B 306, as shown in FIG. 3). When connecting to the Node 306, the Client CIM 302 suitably performs those commonly known in the art tasks such as authenticating, verifying connectivity, and other such tasks.

Once the connection between the Client (via the Client CIM 302) and the Node 306 is established, the process continues with the Client sending a query to the CIMOM 312 on the Node 306 (Block 404). It is to be appreciated, that depending upon the specific implementation of the process of the present invention, that a request may have to be specified in a particular format in order to be valid. One such format includes HTTP, but, the present invention is not so limited. Further, the query suitably contains a request(s) for information about either the Resources connected to the Node 306 and/or Resources connected to other Nodes (for example, Node A 304 and Node C 308) on the Cluster 300. At this point, the CIMOM 312 determines whether the query from the Client is a request for Resource information or a request for other information or services (for example, a request to lock-up a Resource) (Block 406). If the query is for non-Resource information or services provided by the Node 306, the CIMOM 312 processes the request using established procedures that are beyond the scope of the present invention (Block 407).

When the query is for Resource information, the CIMOM 312 suitably passes the query to the MP 334 (Block 408). The MP 334 then determines the scope of the query (Block 410). It is to be appreciated that a query from a Client may request information on every Resource on a Cluster, a limited type of Resources (for example, only information on disc drives), information on limited Resources as identified by specific Nodes, and/or based upon any other criteria. In order to determine from which Nodes a Client may desire to request information, the present invention enables a Client to request discovery on the Cluster 300 (Block 412).

When discovery is requested, the CIMOM 312, via the MP 334, suitably communicates a broadcast probe across the Cluster 300 (Block 414). The broadcast probe may be a general probe wherein, for example, every CIMOM Node (for example, Node A 304 and Node C 308, in FIG. 3) identifies itself to the requesting CIMOM Node (Node B 306). Alternatively, any level of specificity may be utilized in requesting CIMOM Nodes and/or Providers (which, in certain embodiments, may even include those Providers connected to the requesting CIMOM Node) to identify their existence to the requesting CIMOM Node. For example, a broadcast probe might seek only those Providers that are connected to data storage Resources. Similarly, other broadcast probes might seek processors capable of performing specific operations. Thus, the broadcast probe may be for any topic and sent to any desired distribution of Nodes, Clusters, Resources, and/or Providers.

The requesting CIMOM Node (for this example, Node B 306) suitably receives replies from the responding CIMOM Nodes (e.g., Node A 304 and Node C 308) and compiles a table that includes a listing of such responses (Block 416). The CIMOM 312 then supplies this information, preferably, but not necessarily, in tabular form, to the Client CIM 302 (Block 418). The Client CIM then suitably specifies a scope for the query (Block 420) based upon the listings provided by the CIMOM 312. The scope may specify specific, or all, Nodes, Resources, Providers, real or virtual elements, sub-components and/or aspects that are to receive the query. Further, the scope may also specify that certain CIMOM Nodes are to receive certain aspects of the query, while other CIMOM Nodes receive other aspects of the query. This may be desirable when a query is a compound query that seeks identification of multiple Resources and/or Providers that may or may not provide unique or different functions and/or services.

Further, it is to be appreciated that for certain queries, wherein large amounts of information may be requested from multiple CIMOM Nodes and/or Providers, sub-sets of queries might be desired and/or multiple queries might be utilized. The present invention suitably supports any scope and may be configured, as desired by specific applications, to support queries which utilize compounded scopes or otherwise. The present invention provides Clients, CIMOMs and/or MPs with the capabilities to submit queries of any desired scope. In short, the scope effectively allows the Clients, CIMOM and/or MPs to specify, in advance, from whom they are going to request information.

Additionally, the present invention supports the concept of pre-defined/default scopes. Such a scope might include, for example, all of the local CIMOM Nodes on a Cluster, or all of the Providers connected to certain CIMOM Nodes, and the like. These pre-defined scopes may be utilized at any time and may be specified by a Client as necessary and/or desired. It is to be appreciated that scopes may be suitably stored in almost any available data storage device known in the art and retrieved accordingly, as desired and/or necessary, by the Client CIMOM and/or a CIMOM Node.

Referring again to FIGS. 4A and 4B, the process continues after Block 420 with the CIMOM 312 communicating the request and the scope of the request to the MP 334 (Block 422). The MP 334 then requests classes of objects from the CIMOMs on the respective CIMOM Nodes (in this example, Nodes A 304 and B 308) and from the Providers associated with such CIMOM Nodes (i.e., 316, 318, 320, 322, 324 and 326) (Block 424). The request communicated from the MP 334 to the CIMOM Nodes is preferably communicated with a local scope. This local scope effectively instructs the MP on each of the CIMOM Nodes to not conduct a Cluster-wide search and, instead, to conduct a search only of those Providers with which each CIMOM Node is associated. For example, a local scope request communicated to CIMOM Node A 304 would instruct the CIMOM Node to only communicate the request to Provider A 316 and/or Provider B 318, i.e., the Providers directly connected or associated with CIMOM Node A 304. Such a local scope request would not obtain information for Providers connected to CIMOM Node C 308. If information was desired from CIMOM Node C, the MP 334 would need to communicate a local scope request directly to CIMOM Node C 308 in order to obtain information, for example, pertaining to Provider A 324. Commonly, this process is further supported by the knowledge of the particular classes/schemas of objects held by each CIMOM for its related Providers, such that each CIMOM Node does not spend unnecessary time contacting Providers incapable of providing the requested information.

More specifically, when a Provider is started on a Node, the CIMOM for that Node obtains from the Provider the types of classes/schemas held by the Provider. This information is then suitably stored by the CIMOM for later utilization. Further, a determination is made as to whether such classes are to be multiplexed, i.e., available to the MP. If so, then these classes are suitably stored in a multiplex table associated with the CIMOM Node. When the request comes from the MP on the requesting CIMOM Node, each CIMOM Node receiving the request utilizes the class/schema information previously extracted from the Providers and stored in their respective multiplex tables to determine to which Providers to further communicate the query. As such, for the present embodiment, the process is preferably utilized in conjunction with MP. But, the process may also be utilized with non-multiplexed Providers, provided the requesting CIMOM Node includes, and utilizes, an MP. Further, it is to be appreciated that non-multiplexed Providers may still be accessed by a system implementing the process of the present invention. However, such access is usually provided by having the MP directly connect to a Provider utilizing a process similar to one of the prior art processes previously described herein or a comparable process.

Referring again to FIGS. 4A and 4B, after the request is communicated by the MP 334 to each CIMOM Node on the Cluster (or a limited set thereof) with a local scope, the process continues with such CIMOM Nodes returning the desired information, if available, back to the MP 334 on the requesting CIMOM Node (i.e., Node B 306) (Block 426). The MP 334 on the requesting CIMOM Node 306 then combines the various results received from the various CIMOM Nodes/Providers into tables which are suitably combined as desired and/or necessary (Block 428). The tables may be combined in any manner specified by the Client. Such manners might include showing all instances received on various tables and/or only showing unique entries. Other combinations and/or filters may also be utilized to sort, organize and/or present requested and received information to a Client. Also, commonly known query languages and techniques can be utilized to accomplish any desired filtering of received data, as desired by the Client or Cluster manager.

Upon production of the tables by the requesting CIMOM, the process then continues with the Client CIM 302 receiving the completed table (or, in certain instances, portions thereof) and communicating such results to the Client (Block 430). At this point in the process, the Client has then received the requested information.

At this point, the process ends (Block 432) until another request is generated by the same or a different Client. As such, it is to be appreciated that the process flows depicted in FIG. 4 may occur simultaneously on multiple nodes of a network, when such Nodes are suitably configured to operate in conjunction with an MP.

Therefore, the present invention has been described in the context of a process flow implemented on a system that utilizes CIMs, CIMOMs, MPs and Providers to communicate with, request and receive information about objects/schemas on a Cluster without requiring Cluster-aware Providers and/or Clients that are capable of communicating with every Node on a Cluster. Further, while the present invention has been described in the context of specific embodiments and process flows, it is to be appreciated that the present invention is not so limited and may encompass any systems and/or process flows which are within the scope of the present invention as specified by the following and any subsequently added claims.

The invention claimed is:

1. A system for requesting information about Resources comprising:

a Client CIM, for receiving a request from the Client for information about at least one Resource on a Cluster, and providing the request to a requesting Node on the Cluster;

a requesting CIMOM, provided on the requesting Node and connected to the Client CIM, for receiving the request, wherein the requesting Node comprises a Multiplex Provider for communicating the request to additional CIMOM Nodes on the Cluster; and a plurality of additional CIMOM Nodes on the Cluster and connected to the requesting CIMOM Node, wherein, in response to the request, the Multiplex Provider sends a broadcast probe to the plurality of additional CIMOM Nodes on the Cluster, wherein the requesting Node receives a reply from one or more of the additional CIMOM Nodes and forwards the reply to the Client CIM and based on a scope of query received from the Client CIM, the requesting CIMOM transmits a query to the one or more of the additional CIMOM Nodes on the Cluster.

2. The system of claim 1, whereupon receiving the request for information at at least one of the plurality of additional CIMOM Nodes obtains information from at least one Provider associated with the at least one of the plurality of additional CIMOM Nodes and forwards the obtained information to the Multiplex Provider.

3. The system of claim 2, whereupon receiving the obtained information, the Multiplex Provider compiles the obtained information with information obtained from at least one additional Provider into a table, the table being presented to the Client.

4. The system of claim 1, wherein each of the requesting CIMOM Node and the at least one of the plurality of additional CIMOM Nodes is compliant with at least one of the Common Information Modeling standard and the WBEM standard.

5. The system of claim 1, wherein the request further comprises a scope for the request, the scope designating from which of the plurality of additional CIMOM Nodes the requesting CIMOM Node is to request information.

6. The system of claim 5, wherein the requesting CIMOM Node communicates a local scope to the at least one of the plurality of additional CIMOM Nodes, wherein the local scope directs each of the at least one of the plurality of additional CIMOM Nodes receiving the local scope to request the information on a local scale.

7. A process for receiving information about Resources on a Cluster comprising:
receiving a request from a Client at a first Node on a Cluster;
providing the request to a Multiplex Provider associated with the first Node;
broadcasting the request, via the Multiplex Provider, to more than one CIMOM Node;
receiving information from at least one CIMOM Node, through the Multiplex Provider;
compiling the received information;
providing the received information to the Client through the first Node;
receiving a scope of query from the Client; and
transmitting a query to one or more CIMOM nodes on the Cluster based on the scope of query received from the Client.

8. The process of claim 7, wherein the request is communicated by the Client through a Client CIM connected to a requesting CIMOM associated with the first Node.

9. The process of claim 8, wherein each of the Client CIM and the requesting CIMOM is compliant with the Common Information Modeling standard.

10. The process of claim 7, wherein the request further comprises a request for discovery of at least one Resource available on the Cluster.

11. The process of claim 10, whereupon receiving a request for discovery, the first Node directs the Multiplex Provider to discover which of the at least one Resource is available from which Nodes on the Cluster, and the first Node stores a result of the discovery in a database.

12. The process of claim 11, wherein a result of the request for discovery results in an identification of at least one Resource on a Cluster which meets a predefined threshold specified by the Client.

13. The process of claim 7, wherein the request further comprises an indication of a scope for requesting information from the Cluster.

14. The process of claim 13, wherein the scope includes a request for information from at least one of a Node, a Provider, a type of Provider, a Resource, a type of Resource and a subset of a Resource.

15. A process for determining which Resources are present on a Cluster comprising:
establishing a communications link between a Client and at least one Node on the Cluster, wherein the Client is requesting information about at least one Resource on a Cluster; and
broadcasting a scope of the request to a plurality of CIMOM nodes in the Cluster, wherein the scope specifies a field of search on the Cluster, wherein the scope is determined by a Client based upon a result of a discovery, wherein the discovery further comprises sending a query from a requesting CIMOM Node to more than one CIMOM Node from the plurality of CIMOM nodes in the Cluster, the query further comprising a request for an identification of at least one of a Node, Resource, Provider and object that is accessible via the Cluster.

16. The process of claim 15, wherein at least one additional CIMOM Node from the plurality of CIMOM nodes provides a response to the request, the response including an identification of at least one object on the Cluster and whereupon receiving the response, the request is compiled into a tabular form by the requesting CIMOM Node.

17. The process of claim 16, wherein the process further comprises filtering the identification of at least one object for presentation on the Client Node.

18. A process for obtaining information about at least one Resource on a Cluster comprising:
receiving a request, for information about a Resource on a Cluster, from a Client through a Client CIM, and a Client CIMOM provided on a first Node on the Cluster;
providing the request to a Multiplex Provider;
determining a scope of the request;
performing discovery on the Cluster for a Provider providing information responsive to the request by sending a broadcast probe across the Cluster including a plurality of CIMOM nodes via the multiplex provider;
receiving, from an additional CIMOM Node in the Cluster a Resource and a Provider in response to the broadcast probe;
providing the response to the broadcast probe to the Client, via the Client CIM;
receiving from the Client, via the Client CIM, a scope for the query, wherein the scope includes an identification of the one additional CIMOM Node, Resource and Provider that responded to the broadcast probe to whom the Client desires to communicate the query;

communicating the query to at least one of the CIMOM Nodes in the Cluster, Resources and Providers identified by the scope of the query;

receiving information in response to the query from at least one of the CIMOM Nodes, Resources and Providers identified by the scope of the query;

compiling the information received into a table; and providing the compiled data to the Client via the Client CIM.

19. A computer readable medium containing instructions for implementing the process of claim 18.

* * * * *